No. 610,748. Patented Sept. 13, 1898.
H. N. RIDGWAY.
BICYCLE HANDLE BAR.
(Application filed Nov. 22, 1897.)
(No Model.)
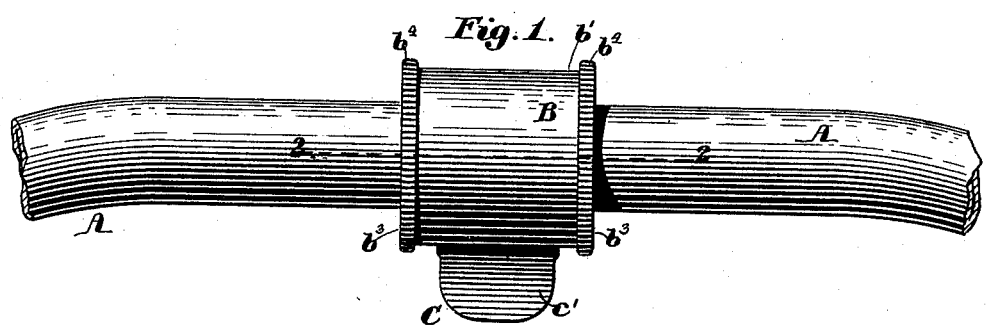
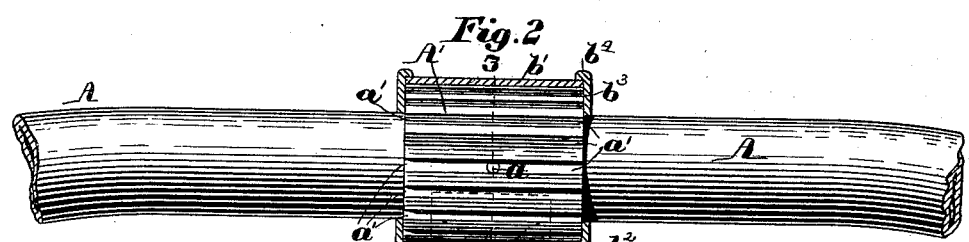
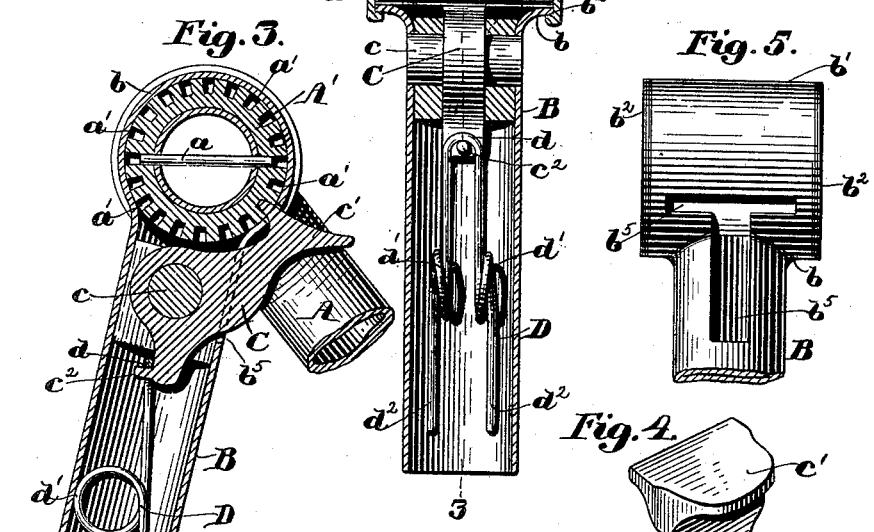
Witnesses:
Walter E. Lombard
Edward F. Allen
Inventor:
Herbert N. Ridgway,
by Crosby Gregory,
Attys.

UNITED STATES PATENT OFFICE.

HERBERT N. RIDGWAY, OF WINTHROP, MASSACHUSETTS.

BICYCLE HANDLE-BAR.

SPECIFICATION forming part of Letters Patent No. 610,748, dated September 13, 1898.

Application filed November 22, 1897. Serial No. 659,365. (No model.)

*To all whom it may concern:*

Be it known that I, HERBERT N. RIDGWAY, of Winthrop, county of Suffolk, State of Massachusetts, have invented an Improvement in Bicycle Handle-Bars, of which the following description, in connection with the accompanying drawings, is a specification, like letters on the drawings representing like parts.

My invention is an improvement for bicycle handle-bars, having for its object the provision of simple and compact mechanical means for permitting the adjustment of the handles at any inclination by the rotation of the handle-bar, the latter being locked and released by an automatic dog. Various expedients for accomplishing this same general purpose have heretofore been suggested and resorted to, but most of them are either cumbrous and awkward or expensive and complicated, and accordingly I have invented the hereinafter-described apparatus with a view to obviating these objections.

The details of my invention will appear more fully in the course of the following description, reference being had to the accompanying drawings illustrative of one embodiment thereof, in which—

Figure 1 is a top or plan view of my invention applied to a usual handle-bar, the latter being broken away. Fig. 2 is a central vertical section thereof, taken on the line 2 2, Fig. 1. Fig. 3 is a transverse vertical section thereof, taken on the line 3 3, Fig. 2. Fig. 4 is a perspective view of the locking-dog; and Fig. 5 is a fragmentary rear elevation of the post, showing the recess therein for the locking-dog.

The handle-bar A and post B may be and are in general of the usual kind found in bicycles and other vehicles of that class.

On the handle-bar I mount a fluted bushing or ratchet $A'$, which may be secured thereto in any desired manner, being herein shown as fastened by a pin $a$, passing through the bushing and the handle-bar. (See Figs. 2 and 3.) This bushing is transversely fluted or grooved to provide holding-notches $a'$, preferably of considerable length, as shown in Fig. 2, so as to give an extended bearing-surface for a dog C, pivotally mounted on a bearing, herein shown in the form of a bolt $c$, secured at its opposite ends in the post B.

The upper end of the post B is flanged, as shown at $b$, and provided with a socket or thimble-like end $b'$, threaded at $b^2$ on its peripheral ends to receive inclosing caps $b^3$, herein shown as in the form of annular plates, provided with peripheral flanges $b^4$, threaded to fit snugly on the threaded ends of the socket $b'$. This provision incloses the teeth of the bushing or ratchet $A'$ neatly and compactly, rendering the same impervious to dust, and, moreover, is exceedingly inexpensive to manufacture and simple to put together.

The dog C is pivoted in direct line beneath the handle-bar, so that it serves to support a considerable part of the weight brought to bear upon the latter.

The post B is cut away at $b^5$, Figs. 3 and 5, so as to permit the upper part of the dog C to project rearwardly in convenient position for the rider to engage a thumb-piece $c'$, provided at its free end for depressing it out of engagement with the ratchet $A'$.

At its lower end, within the tubular post B, the dog C has a lug $c^2$, over which is mounted a looped end $d$ of a stiff spring D, shown as having a coil $d'$ in each member thereof and extended downwardly therefrom into engagement at $d^2$ with the rear inner side of the post or fork for the front wheel, said spring acting by its end $d$ against the dog C, firmly holding it in the position shown in full lines in Fig. 3. The spring D takes two bearings in the post, one at its end at $d^2$ and the other by its coil $d'$, acting against the interior of the post.

In use whenever the rider wishes to change the position of the handle-bar all that is necessary is to slightly depress the dog C by bearing on the thumb-piece $c'$, and then, having rotated the handle-bar into the desired position, the dog is permitted automatically to interlock with the ratchet $A'$ simply by releasing the hand from the thumb-piece $c'$.

It will be obvious that by reason of my invention the parts may be made with minimum of cost. The handle-bar is of the usual kind, whereas in many constructions heretofore proposed it has been necessary to make a special handle-bar.

In the construction above described, however, all that is necessary is to cut off from a fluted tube the desired lengths of bushings for the ratchets, and these are simply slipped onto the handle-bars in place, where they are secured rigidly by the pin $a$ or other means, and then the cap-plates $b^3$ are turned firmly into place against the ends of the bushing, thereby rigidly locking the handle-bar against endwise movement, while leaving it free to be rotated as desired. The spring having the construction and being located as shown requires no fastening or other connections and yet is always in operative engagement with the dog, holding the latter normally interlocked with the ratchet.

Having fully described my invention, what I claim, and desire to secure by Letters Patent, is—

1. The combination with a handle-bar and its post, of an independent fluted bushing or annular ratchet rigidly fixed on the handle-bar, said post being provided with a cylindrical or thimble-like end snugly fitting over said annular ratchet, and threaded at its ends, annular caps threaded to engage said thimble-like end, a dog pivotally mounted in said post below said ratchet and engaging the latter at its upper end, said dog being provided with a thumb-piece projecting from said post to be engaged by the rider and at its lower end projecting within the post, and a spring normally holding said dog in engagement with said ratchet, substantially as described.

2. The combination with a handle-bar and its post, of an independent fluted bushing or annular ratchet rigidly fixed on the handle-bar, said post being provided with a cylindrical or thimble-like end snugly fitting over said annular ratchet, and threaded at its ends, annular caps internally threaded onto said thimble-like end against the ends of said ratchet, a dog pivotally mounted in said post below said ratchet and engaging the latter at its upper end, said dog being provided with a thumb-piece projecting from said post to be engaged by the rider, and at its lower end projecting within the post; and a spring normally holding said dog in engagement with said ratchet, said spring comprising a loop engaging said depending end of the dog and coils intermediate said loop and the ends of the spring, said ends bearing against one side of the post and said coils against the other side thereof, substantially as described.

In testimony whereof I have signed my name to this specification in the presence of two subscribing witnesses.

HERBERT N. RIDGWAY.

Witnesses:
GEO. W. GREGORY,
EMMA J. BENNETT.